United States Patent [19]

Heavey et al.

[11] Patent Number: 5,375,052
[45] Date of Patent: Dec. 20, 1994

[54] CO-INVERTER APPARATUS

[75] Inventors: Frederick D. Heavey, Forest Lake; Bradley P. Cornell, Stillwater, both of Minn.

[73] Assignee: Dimensions Unlimited, Inc., St. Paul, Minn.

[21] Appl. No.: 105,503

[22] Filed: Aug. 11, 1993

[51] Int. Cl.$^5$ ............................. H02M 7/00
[52] U.S. Cl. ..................... 363/71; 323/272; 307/80
[58] Field of Search ............ 363/71, 72; 323/272; 307/64–68, 80, 81

[56] References Cited

U.S. PATENT DOCUMENTS

| | | | |
|---|---|---|---|
| 3,094,591 | 6/1963 | Hill | 200/5 |
| 3,105,924 | 10/1963 | Peterson | 317/148.5 |
| 4,052,658 | 10/1977 | Hucker | 363/43 |
| 4,524,411 | 6/1985 | Willis | 363/21 |
| 4,636,931 | 1/1987 | Takahashi et al. | 363/71 |
| 4,843,535 | 6/1989 | Fuchs | 363/71 |
| 4,956,597 | 9/1990 | Heavey et al. | 320/14 |
| 5,038,265 | 8/1991 | Paladel | 363/65 |
| 5,122,726 | 6/1992 | Elliott et al. | 323/272 |
| 5,189,599 | 2/1993 | Messman | 363/21 |

Primary Examiner—Steven L. Stephan
Assistant Examiner—Adolf Berhane
Attorney, Agent, or Firm—Leone & Moffa

[57] ABSTRACT

A power supply apparatus comprising a first apparatus for supplying power having a first power output, a second apparatus for supplying power having a second power output and a load monitoring apparatus for monitoring a third power output. The load monitoring apparatus has an input coupled to the third power output, and the load monitoring apparatus also includes a monitor output. A switching apparatus connects the first power output and the second power output to the third power output, wherein the switching apparatus has an input connected to the monitor output and switches in response to the monitor output.

15 Claims, 9 Drawing Sheets

CO-INVERTER APPARATUS

FIELD OF THE INVENTION

The present invention relates generally to electrical inverters for inverting DC power into AC power. More particularly, the present invention relates to a co-inverter apparatus utilizing a main inverter and a secondary inverter depending upon the size of the load being serviced.

BACKGROUND OF THE INVENTION

In the prior art, buildings or vehicles, such as recreational vehicles, which are isolated from utility company power lines or, for other reasons, cannot be directly hooked up to utility company power lines use direct current power sources such as batteries for electrical power. For example, a typical recreational vehicle uses storage batteries to provide electrical power to any electrical devices when it is mobile. Such devices may include refrigerators, radios, televisions and microwave ovens. Direct current from the storage batteries is converted into alternating current through the use of an inverter.

When the electrical load presented by these devices is high, a large inverter may operate efficiently. However, when the load presented by the devices within the home or recreational vehicle drops, keeping a large inverter running requires an excessive amount of energy. For example, an idling large inverter may consume 12-15 watts in a typical recreational vehicle application. This excessive energy use prematurely drains storage batteries and provides no power other than to maintain the inverter in a ready state. In the prior art, attempts have been made to sense drops in such electrical loads and to respond to lower loads by removing or turning off the inverter if the load drops below a preselected threshold voltage. Unfortunately, it is very hard to determine the threshold at which the main inverter should be taken off line. These load sensing circuits are often known under the name of "sleep", "search", "idle current", or "idle mode" circuits. Also, there are certain electronic devices run by alternating current which present a very light load to the inverter. Such light loads as presented, for example, by digital clocks and electronic ballast lights are difficult to sense. Thus, when an inverter goes off line in response to a decrease in demand below a low threshold the use of such low power devices is interrupted until the inverter is turned on again by an increase in demand above the threshold. This is frustrating to the operator who must now reset these light load devices for the proper time or take other corrective action.

It is therefore a motivation of the present invention to maintain residual loads serviced by an inverter system while working at a higher efficiency of energy conversion than prior art devices.

SUMMARY OF THE INVENTION

In contrast to the prior art, the present invention provides a power supply apparatus comprising a first means for supplying power having a first power output, a second means for supplying power having a second power output and a load monitoring means for monitoring a third power output. The load monitoring means has an input coupled to the third power output, and the load monitoring means also includes a monitor output. A switching means connects the first power output and the second power output to the third power output, wherein the switching means has an input connected to the monitor output and switches in response to the monitor output.

In one embodiment, the present invention provides a co-inverter apparatus for supplying alternating current to a load, including first and second means for inverting direct current to alternating current. The second inverting means has a current level output. A switching means for engaging and disengaging the first inverter means from the load is coupled at an input to the first inverter means and coupled at an output to the load. A means for controlling the switching means is connected to the switching means control input. The controlling means includes first and second comparator inputs where the first comparator input is connected to a first predetermined threshold signal and further includes third and fourth comparator inputs where the third comparator input is connected to a second predetermined threshold signal. A sensing means for monitoring the current level output and sensing a load increase from the second inverting means is connected at a first input to the current level output. The sensing means has a load increase signal which is connected to the second comparator input of the controlling means. The controlling means compares the load increase signal to the first predetermined threshold signal and, if the load increase signal exceeds the predetermined threshold signal, in response supplies a set signal to the switching means control input. The switching means then engages the first inverter to the load in response to the set signal. If the load signal is less than the second predetermined threshold, the controlling means supplies a reset signal to the switching means control input, and the switching means disengages the first inverter from the load in response to the reset signal.

Other objects, advantages and features of the invention will become apparent to those skilled in the art from the description of the preferred embodiment, claims and drawings herein wherein like numerals refer to elements.

DESCRIPTION OF THE PREFERRED EMBODIMENT

Figure 1:
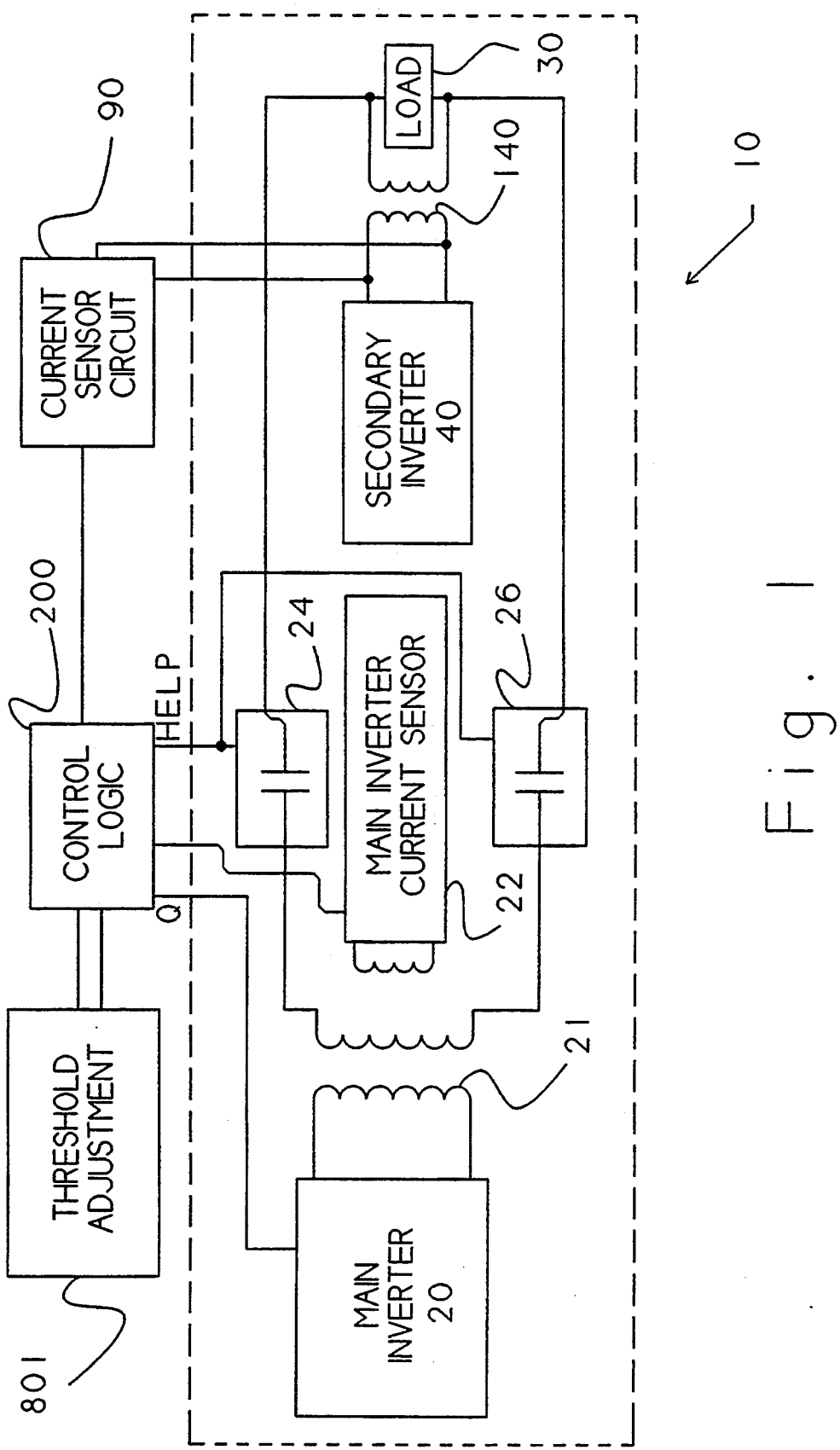
FIG. 1 is a block diagram of one example of a co-inverter apparatus fabricated in accordance with the present invention.

Referring now to FIG. 1, a block diagram of one example of a co-inverter apparatus as employed by the present invention is shown. The co-inverter apparatus 10 includes a main inverter 20, a first isolation transformer 21, a main inverter current sensor 22, a secondary inverter 40, a current sensor circuit 90, inverter control logic 200, and a threshold adjustment circuit 801. The main inverter 20 may be any conventional inverter design. In one example of the invention the main inverter is a 2.5 kilowatt inverter. Those skilled in the art will recognize that the principles taught by the instant invention are not so limited as to the size of the inverters. The secondary inverter 40 is a smaller capacity inverter than the main inverter 20. In one example of the invention the secondary inverter 40 may advantageously be about a 100 watt inverter which is sufficient for running smaller loads such as, for example, digital clocks. Also included in the apparatus of the invention are relays 24, 26 which are used to switch the main inverter 20 on line and connect it with a load 30. The secondary inverter 40 is always on line and coupled through isolation transformer 140 into the load 30. The co-inverter circuit is explained in more detail herein with reference to FIG. 3A and FIG. 3B.

Figure 2:
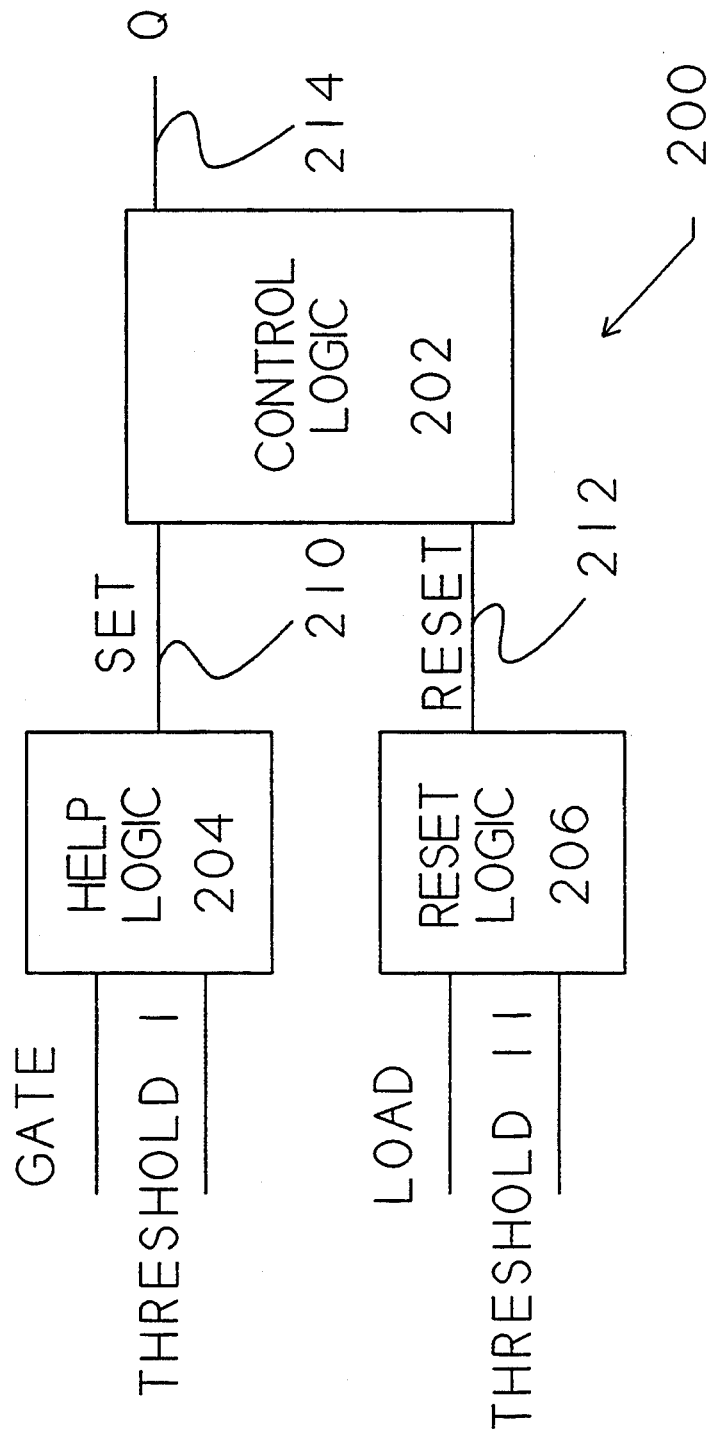
FIG. 2 is a more detailed block diagram of the control logic as employed in one embodiment of the present invention.

Now referring to FIG. 2, the inverter control logic 200 is shown as further comprised of HELP LOGIC 204, RESET LOGIC 206 and CONTROL LOGIC 202. The HELP LOGIC 204 supplies a signal set on line 210 to the CONTROL LOGIC 202. The RESET LOGIC 206 supplies a signal RESET on line 212 to a second input of the CONTROL LOGIC 202. The CONTROL LOGIC 202 supplies a signal Q on line 214 as a control signal output. The logic circuits 202, 204 and 206 are described further in detail herein below.

Figure 3A:
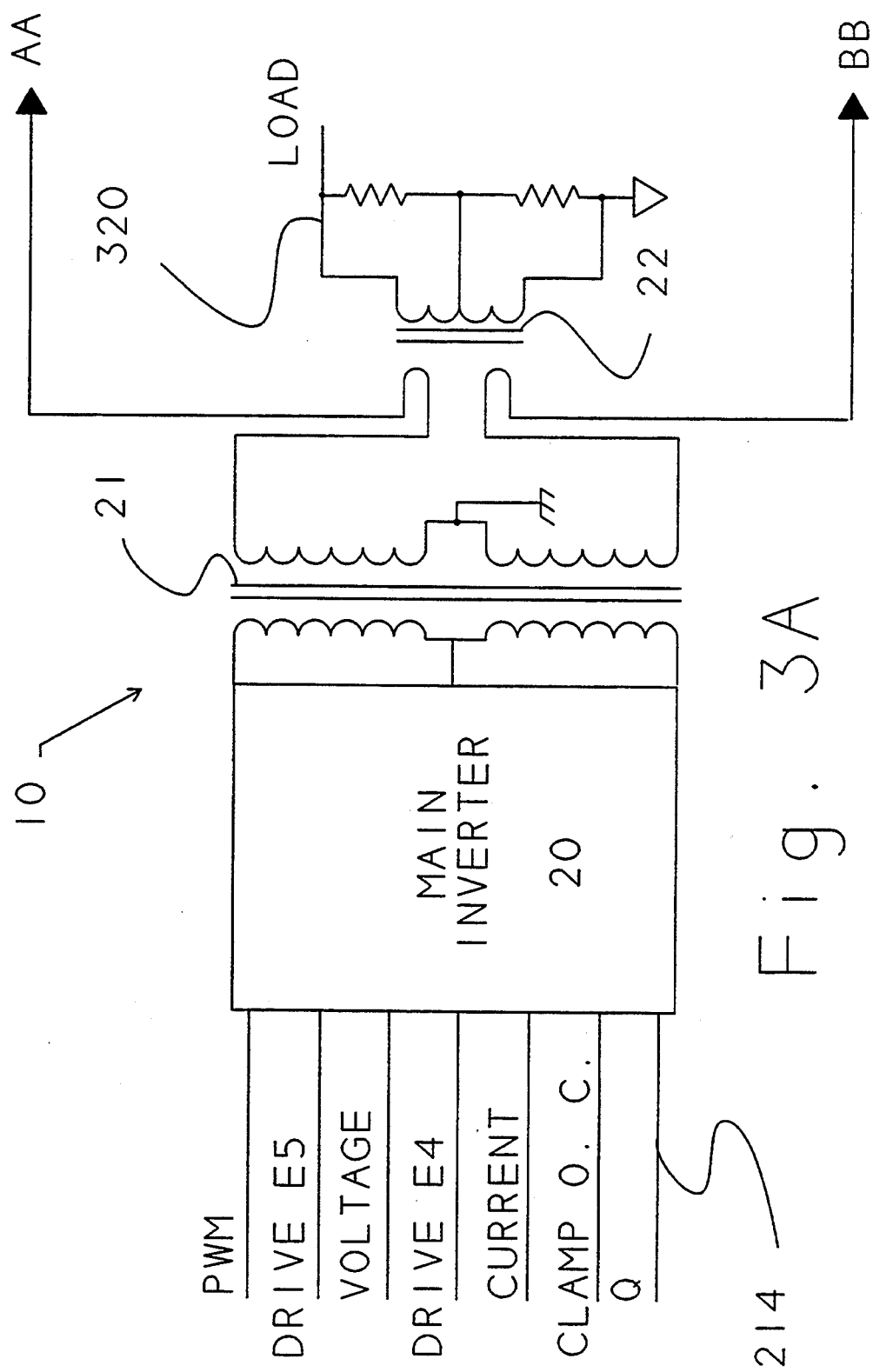
FIG. 3A and FIG. 3B are intended to be viewed together and show a more detailed circuit schematic of a co-inverter circuit as used in one embodiment of the present invention.
Figure 3B:
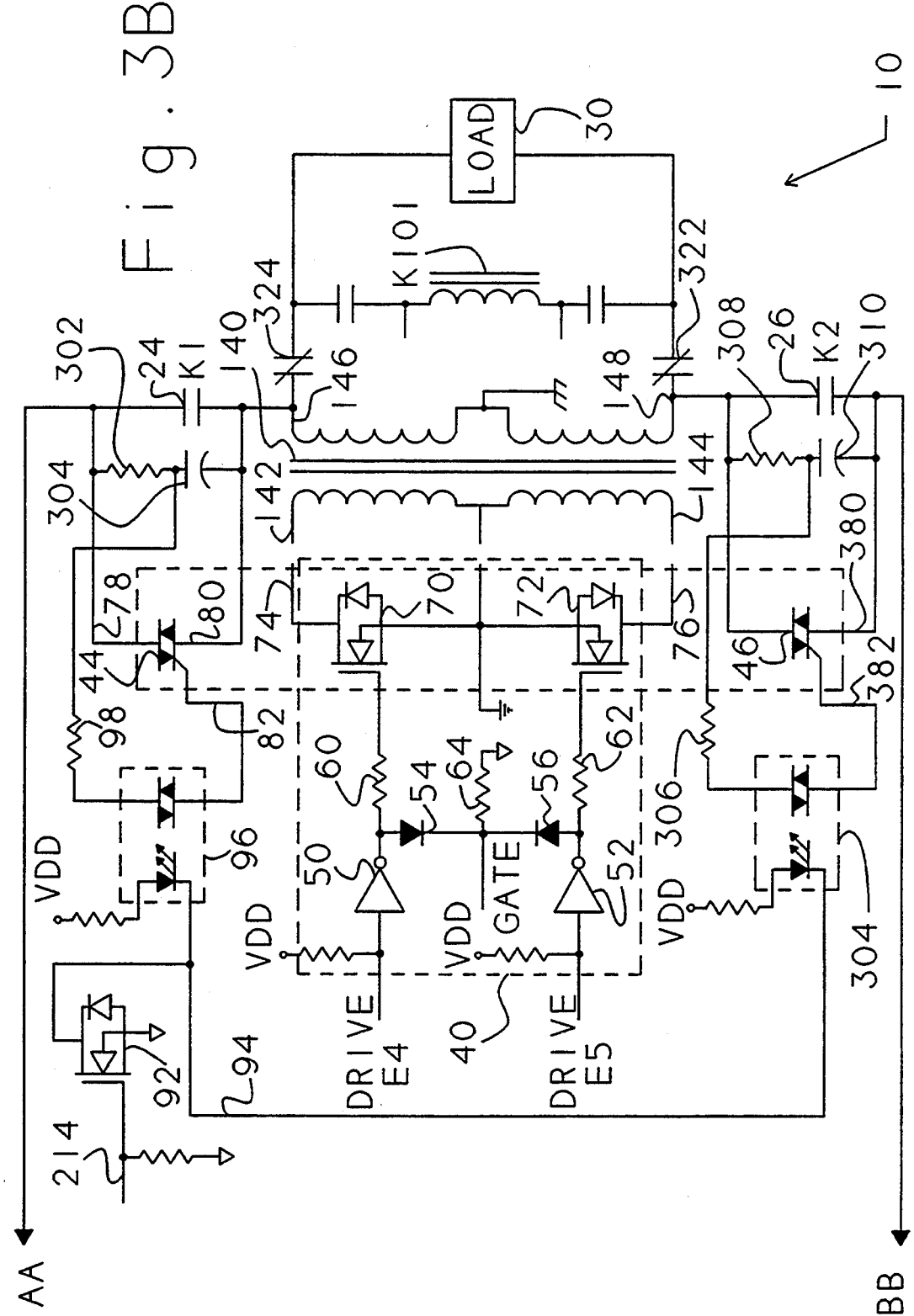

Referring now to FIG. 3A and FIG. 3B which are intended to be viewed together, a more detailed schematic diagram of one example of a co-inverter apparatus 10 fabricated in accordance with the present invention is shown. The co-inverter apparatus 10 includes the main inverter 20, the first isolation transformer 21, the current sense transformer 22, co-inverter engagement relays 24, 26, the secondary inverter 40, and thyrister elements 44, 46. The secondary inverter 40 is on-line, that is, coupled to load 30, at all times, while the main inverter 20 is engaged and disengaged as required by the amount of current drawn by load 30.

In one example, the secondary inverter 40 includes a first inverting amplifier 50, a second inverting amplifier 52, first and second diodes 54, 56. The input of the first inverting amplifier 50 is connected to a first drive signal DRIVE E4. The input of the second inverting amplifier 52 is connected to a second drive signal DRIVE E5. The output of the first inverting amplifier 50 is connected through a resistor 60 to the gate of a first output transistor 70. Similarly, the output of the second inverting amplifier 52 is connected through a resistor 62 to the gate of a second output transistor 72. Output transistors 70, 72 may advantageously be field effect transistors (FETs) or equivalent devices known in the art. The outputs 74, 76 respectively of transistors 70, 72 are connected to first and second terminals 142, 144 of transformer 140. Transformer 140 is used as an isolation transformer and connects the secondary inverter 40 to the load 30 through third and fourth transformer terminals 146, 148.

Thyrister 44 has first, second and third terminals 78, 80 and 82. The third terminal 82 is a control terminal which accepts switching signals for activating and deactivating the thyrister 44. The circuit which switches the thyristers on and off comprises a MOSFET 92 and opto-electrical devices 96 and 304. MOSFET 92 has a gate, drain and source. The gate is connected to line 214 which carries the Q signal. The source of the MOSFET 92 is connected to line 94 which is connected to opto-electrical devices 96 and 304. Opto-electrical devices 96 and 304 operate to send a control signal on lines 82 and 382 respectively in order to turn on thyristers 44 and 46 respectively when a Q signal of a first polarity is received on the gate of MOSFET 92 causing the MOSFET 92 to conduct and turn on the opto-electrical devices 96 and 304. Opto-electrical devices 96 and 304 have first and second inputs wherein the first input is connected to a voltage source $V_{DD}$ in a well-known manner. Each opto-electrical device 96, 304 has third and fourth terminals. With respect to opto-electrical device 96, the third terminal is connected to a first terminal of resistor 98. A second terminal of resistor 98 is connected between a resistor 302 and a capacitor 303 which has a second terminal connected to the second terminal 80 of thyrister 44.

Similarly opto-electrical device 304 is connected through resistor 306 to a node shared by resistor 308 and capacitor 310 which is similarly connected to a second terminal 380 of thyrister 46.

The main inverter 20 is also coupled to the current sensing transformer 22. The current sensing transformer 22 senses current from the main inverter 20 and outputs a LOAD signal on line 320. Also shown are transfer relays 322 and 324 which are used in a well-known manner apart from the co-inverter circuit.

A GATE signal may be advantageously provided through diodes 54, 56 where the GATE signal represents a composite of the DRIVE E4 and DRIVE E5 signals. The GATE signal may be advantageously used to synchronize the HELP LOGIC 204 as described below with reference to FIG. 5.

The main inverter 20 is also connected to signals DRIVE E5 and DRIVE E4. Also connected to the main inverter 20 are the Q signal on line 214 and a pulse width modulation signal PWM. The use of pulse width modulation in inverter circuits is well-known. However, in contrast to known devices, the pulse width modulation and drive signals are all continuously supplied. The main inverter 20 and the secondary inverter 40 are driven by the same drive signals, DRIVE E4 and DRIVE E5, insuring synchronous operation of both inverters.

In operation, the current sense transformer 22 senses current when the main inverter 20 is activated. The main inverter 20 is connected when engagement relays 24, 26 are closed and disconnected when engagement relays 24, 26 are opened to the load 30. Thyristers 44, 46 are connected in parallel to the engagement relays 24, 26. Thyristers 44, 46 are turned on to instantaneously connect the main inverter 20 to the load 30 upon receiving a command Q from the CONTROL LOGIC 202. Immediately following activation of the thyristers 44, 46, the engagement relays 24 and 26 are engaged. After engagement of the relays 24, 26 the thyristers 44, 46 are turned off, allowing all of the current from the main inverter 20 to run through the engagement relays. In this way the main inverter 20 may advantageously be instantaneously connected to LOAD 30 by operation of the thyristers, giving the more slowly operating engagement relays time to close without further delay of current flow from the main inverter 20. The life of the thyristers is thus prolonged by providing a short around them once the engagement relays 24, 26 have closed. Thus, when the main inverter is engaged, the thyristers 44, 46 are turned on instantaneously and the engagement relays 24, 26 are closed a few milliseconds later, shorting out the thyristers 44, 46. In one example of the invention, the thyristers conduct about 30 amps of current until the relays 24,26 short them out of the circuit.

Figure 4:
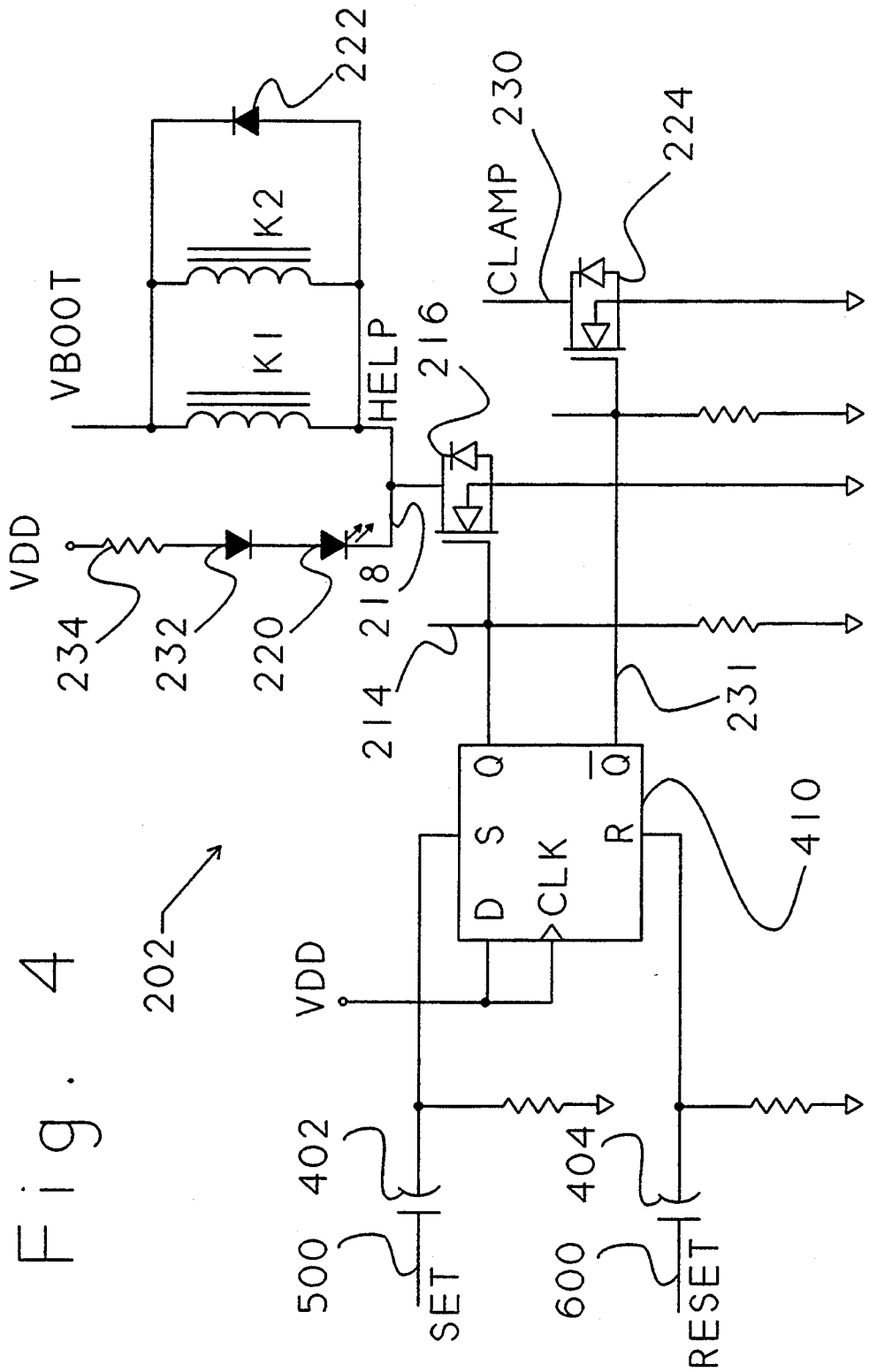
FIG. 4 is a detailed schematic diagram of one example of a control logic circuit as used in one embodiment of the invention.

Referring now to FIG. 4, a more detailed schematic diagram of the CONTROL LOGIC circuit 202 is shown. The CONTROL LOGIC circuit includes a first input at line 500 for receiving the SET signal and a second input connected to line 600 for receiving the RESET signal. Coupling capacitors 402, 404 are placed between the SET and RESET signal lines and a flip-flop 410. Flip-flop 410 responds to the SET and RESET signal lines by outputting signals Q and NOT Q. The Q signal is transmitted on line 214. The NOT Q signal is transmitted on line 231. A MOSFET 216 is connected at its gate to the Q signal. When Q is at a logical high value a MOSFET 216 is turned on and operates as a switch to ground. The source of MOSFET 216 is connected to line 218 which is further connected to a first terminal of both coils K1 and K2 as well as the anode of a diode 222. The cathode of diode 222 and the second terminal coils K1 and K2 are connected to a voltage $V_{boot}$. Also advantageously included in the circuit may be a resistor 234 in series with diode 232 and a light emitting diode 220. Thus, in operation when MOSFET 216 turns on, supplying the HELP SIGNAL, it pulls in engagement relays 24 and 26 which are controlled by coils K1 and K2. Simultaneously diode 220 turns on, supplying, for example, a red light to a control panel. The NOT Q signal is further connected via line 231 to the gate of a second MOSFET 224 which supplies a signal on line 230 called CLAMP. In this example, CLAMP is at ground potential when MOSFET 224 is activated.

Figure 5:
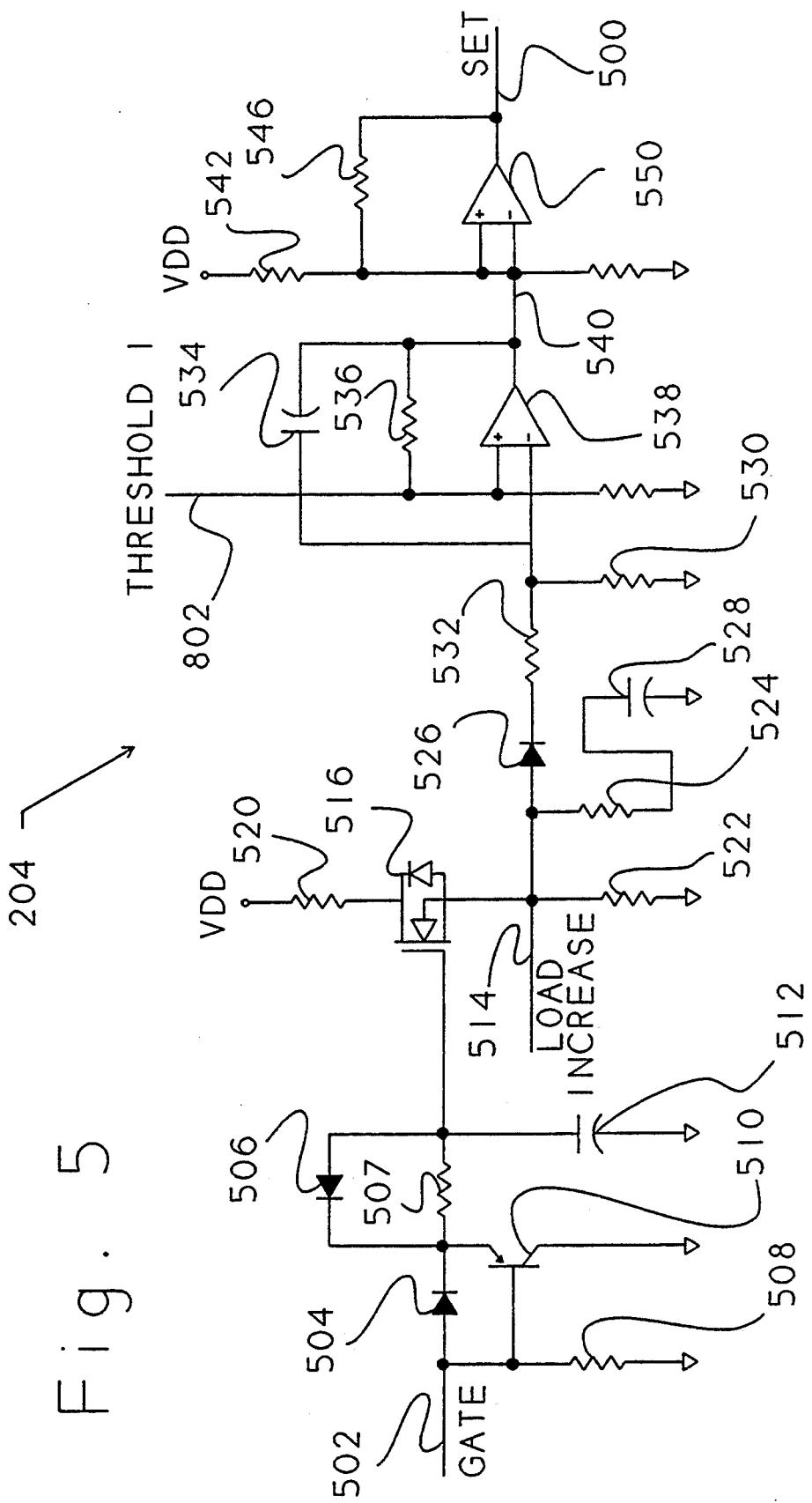
FIG. 5 is a more detailed schematic of one example of a help logic circuit as used in one embodiment of the invention.

Referring now to FIG. 5, a more detailed circuit diagram of the HELP LOGIC 204 as employed in one embodiment of the invention is shown. The HELP LOGIC includes an input on line 502 for receiving the GATE signal. A resistor 508 in the HELP LOGIC is connected at one terminal to ground and at a second terminal to an anode of diode 504. The cathode of diode 504 is connected to the emitter of a transistor 510 having its collector connected to ground and its base to line 502. Also shown is a diode 506 connected to the emitter of the transistor 510 in parallel with a resistor 507. A second terminal of the resistor 507 and the anode of diode 506 is connected to one terminal of capacitor 512. A MOSFET 516 is connected at its gate to the second terminal of resistor 507 and the anode of diode 506. The source of MOSFET 516 is connected to a voltage source $V_{DD}$ through a resistor 520. A second input on line 514 carries the LOAD INCREASE signal. The LOAD INCREASE signal is synchronized to the drive signals and enabled by the application of the GATE signal on line 502. The LOAD INCREASE signal is supplied to an operational amplifier 538 configured as a comparator in combination with capacitor 534 and resistor 536. The LOAD INCREASE signal is transmitted through a diode 526 and a resistor 532. Resistor 522 is tied to the LOAD INCREASE signal line 514 as well as a filter comprising resistor 524 and capacitor 528 in series. A voltage divider comprising resistor 532 and 530 receives the LOAD INCREASE signal from diode 526 and is connected to the capacitor 534 at a first terminal and a first input of operational amplifier 538. A second input of operational amplifier 538 is connected to line 802 carrying the THRESHOLD 1 signal. The output of the comparator, comprised of amplifier 538, resistor 536 and capacitor 534 on line 540, is connected to a first input of a second operational amplifier 550 having a second input. The second input of operational amplifier 550 is connected to voltage source $V_{DD}$ through resistor 542. A feedback resistor 546 is connected across the output of operational amplifier 550 and the second input. A SET signal is thereby transmitted on line 500.

Figure 6:
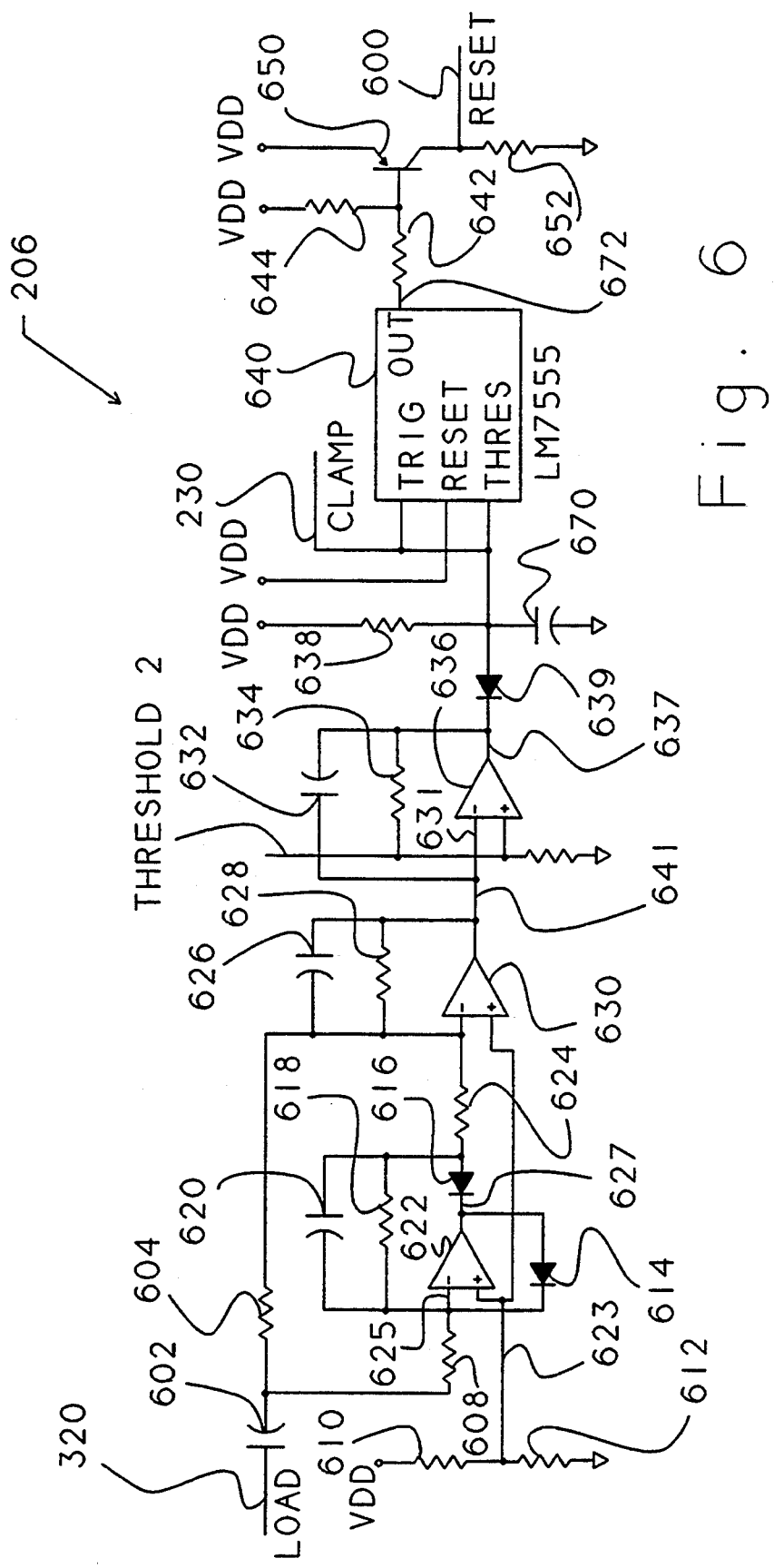
FIG. 6 is one example of a reset circuit as used in one embodiment of the co-inverter apparatus of the invention.

Referring now to FIG. 6, a more detailed circuit diagram of the RESET logic 206 as employed in one embodiment of the invention is shown. A first input is tied to the LOAD signal 320 through a coupling capacitor 602. A resistor 604 is connected to the coupling capacitor 602, as is resistor 608. An operational amplifier 622 has first and second inputs wherein the first input on line 623 is connected between resistors 610 and 612 which comprise a voltage divider circuit for voltage $V_{DD}$. The second input 625 is connected to the second terminal of capacitor 602 through resistor 608. Also included in the circuit are diodes 614, 616, resistor 618 and capacitor 620. Diode 616 is tied at its cathode to the output 627 of operational amplifier 622. The anode of diode 614 is also tied to the output line 627 while the cathode is tied to the second input 625. Capacitor 620 and resistor 618 are connected in parallel across the input 625 of the operational amplifier and the anode of diode 616. The anode of diode 616 is further connected to a first terminal of resistor 624. The second terminal of resistor 624 is connected to a first input 631 of operational amplifier 630. Operational amplifier 630 has a second input connected to line 623. A capacitor 626 and a resistor 628 are also connected at their first terminals to the second terminal of resistor 624. Operational amplifier 630 has an output on line 641 connected to the second terminals of capacitor 626 and resistor 628, and to a first input of a third operational amplifier 636 having a second input connected to line 800 carrying the THRESHOLD 2 signal. A capacitor 632 is connected across the output 637 and the first input of the third operational amplifier 636. A feedback resistor 634 is connected between the output 637 and the first input of operational amplifier 636. A diode 639 is connected at its cathode to output 637 and its anode through a resistor 638 to voltage source $V_{DD}$. A filtering capacitor 670 is also connected to the anode of the diode and to an input of logic device 640. Logic device 640 is connected at two inputs to the CLAMP signal 230. Logic device 640 includes an output 672 which is connected through resistor 642 to the base of transistor 650. Voltage source $V_{DD}$ is also connected to the base of transistor 650 through resistor 644. The collector of transistor 650 is connected to ground through resistor 652. Line 600 carries the RESET signal which is connected to the collector of transistor 650. In this example, transistor 650 comprises a PNP transistor.

Figure 7:
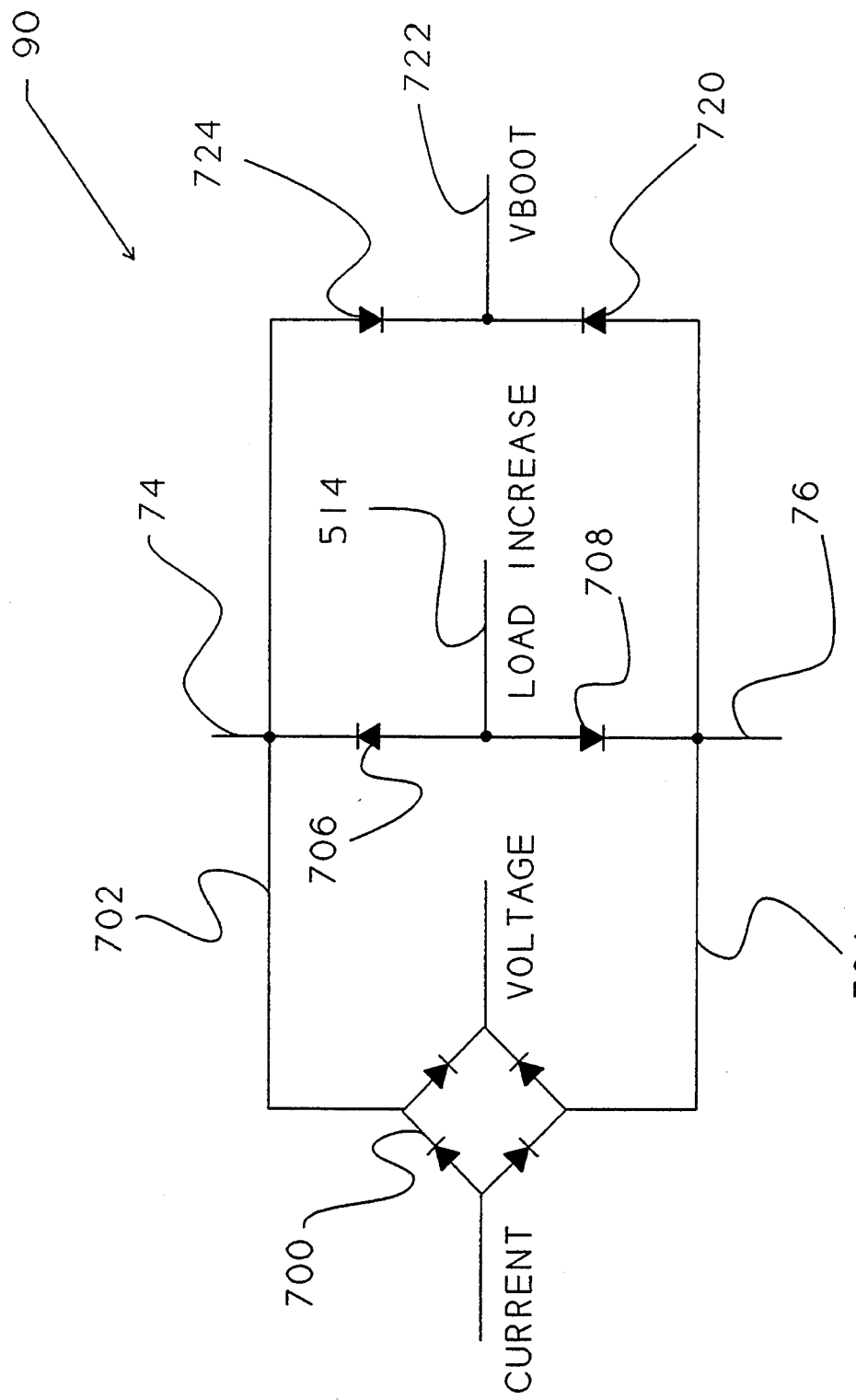
FIG. 7 is a detailed schematic of a load sensing circuit as employed in one embodiment of the present invention.

Referring now to FIG. 7, a more detailed diagram of the current sensor circuit 90 is shown including a rectifier 700, and diodes 706, 708, 724 and 720. The rectifier 700 supplies a CURRENT signal and a VOLTAGE signal. The VOLTAGE signal is proportional to the primary voltage across the secondary inverter 40. The VOLTAGE signal is supplied to the main inverter and used in a well known manner for output voltage regulation. The CURRENT signal may advantageously be provided as a housekeeping function. The CURRENT signal is activated if an overcurrent condition is sensed in the secondary inverter 40. In the case of an extreme overload of the secondary inverter, the CURRENT signal is gated into the main inverter 20 which responds by using conventional logic to shut down the secondary inverter 40. In one example embodiment of the invention, the CURRENT signal is gated on for 400 microseconds after conduction through the transistors 70, 72.

The rectifier 700 is connected at a first node through line 702 to the cathode of the diode 706 and the anode of diode 724. A second terminal of bridge 700 is connected through line 704 to the cathode of diode 708 and the anode of diode 720. Line 722 supplies signal $V_{boot}$ at a node between the cathodes of diode 724 and 720. Line 514 supplies the LOAD INCREASE signal from a node between the anodes of diode 706 and 708. Lines 702 and 704 are further connected to the outputs 74 and 76 from the secondary inverter 40. In one example embodiment of the invention, $V_{boot}$ serves as the power supply voltage for the co-inverter apparatus 10.

Figure 8:
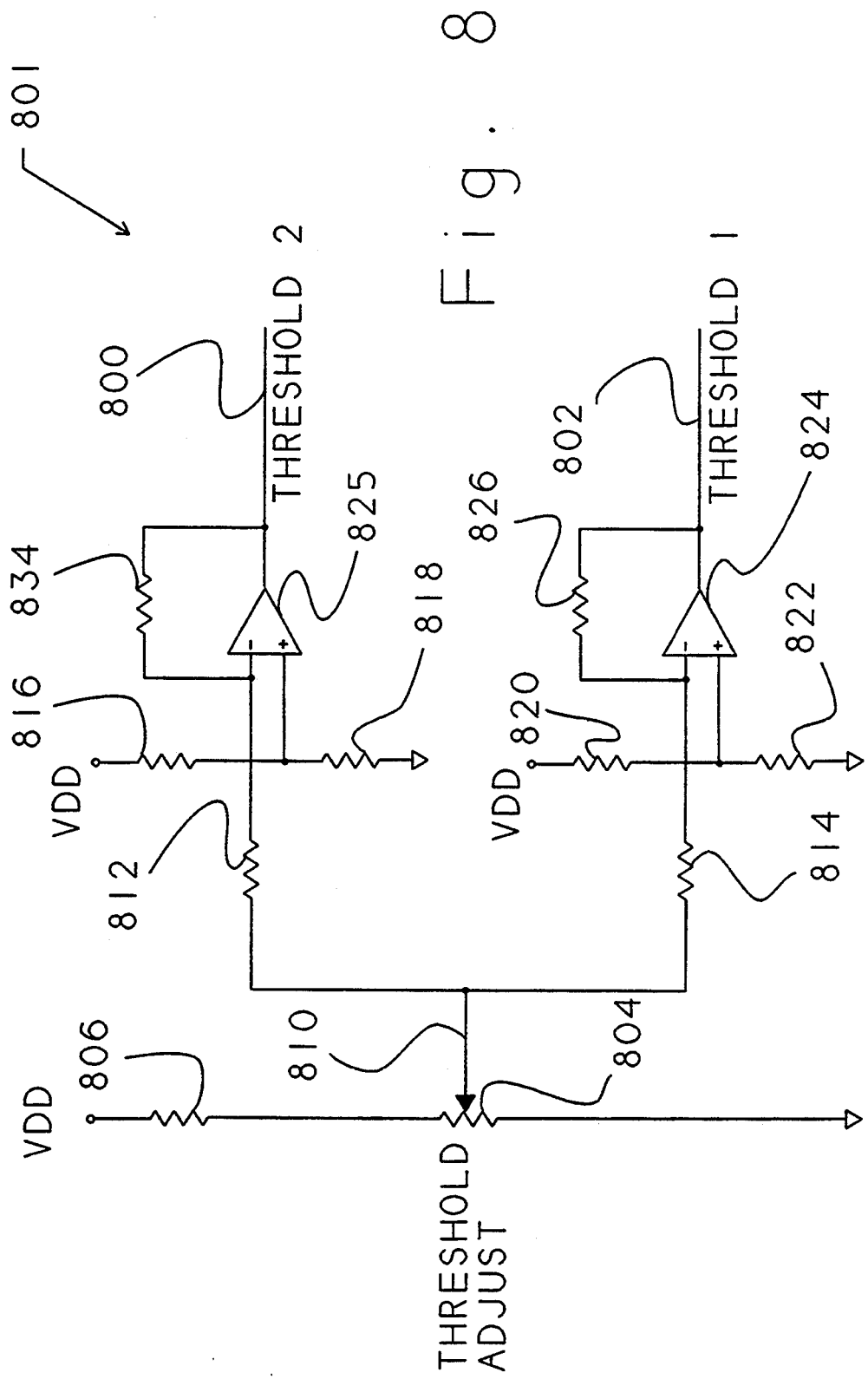
FIG. 8 is a detailed schematic of one example of a threshold adjustment circuit as employed in one embodiment of the invention.

Referring now to FIG. 8, the threshold adjustment circuit 801 as employed in one embodiment of the invention is shown. The main components of the threshold adjustment circuit 801 include a threshold adjust potentiometer 804 and first and second operational amplifiers 824, 825. The threshold adjust circuit comprises the threshold adjust potentiometer 804 which is connected through a resistor 806 to voltage source $V_{DD}$. The threshold adjust potentiometer includes an arm 810 having a wiper terminal connected to the threshold adjust resistor and a second terminal connected to first terminals of resistors 812 and 814. A second terminal of resistor 812 is connected to the operational amplifier 825 through a first input. The second input of operational amplifier 825 is connected through a voltage divider network comprised of resistors 816 and 818 to voltage source $V_{DD}$. A feedback resistor 834 is connected across the first input of operational amplifier 825 and the output at line 800, thereby supplying the signal THRESHOLD 2. Similarly connected are the operational amplifier 824 and resistors 820, 822 and 826 to supply the signal THRESHOLD 1 on line 802. Those skilled in the art will recognize that the resistors comprising the voltage divider networks may vary depending upon the desired outputs of THRESHOLD 1 and THRESHOLD 2. For example, since THRESHOLD 1 is a DC level which is set to determine when the main inverter 20 is pulled on line, it may be set at a value of, for example, 5 amps. THRESHOLD 2, which determines when the main inverter is pulled off line, may be set at a slightly higher value than THRESHOLD 1 as determined by the application. The threshold adjustment may advantageously be user-adjustable in a range, for a typical application, from about 17 watts to about 75 watts.

Referring now concurrently to FIGS. 3A–8, and primarily to FIG. 5, in operation, as the load 30 increases on the secondary inverter 40 the LOAD INCREASE signal on line 514 increases. As the LOAD INCREASE signal increases on line 514 it approaches the voltage of the predetermined THRESHOLD 1 level. When the predetermined THRESHOLD 1 level is exceeded, the comparator circuit, including operational amplifier 538, trips, supplying a signal on line 540 to operational amplifier 550. The amplifier 550 then generates a SET signal which is provided to CONTROL LOGIC 202. The flip-flop 410 in the CONTROL LOGIC 202 senses the SET signal and, in response, transmits a logic 1 from signal Q turning on MOSFET 216 and pulling in engagement relays 24, and 26.

Referring now primarily to FIG. 6, the RESET logic works in a parallel, but opposite, fashion. When the LOAD signal on line 320 exceeds the THRESHOLD 2 signal on line 800 at a second input of operational amplifier 636, logic device 640 operates to cause transistor 650 to output a RESET signal on line 600 to the CONTROL LOGIC 202. Upon receiving the RESET signal on line 600, the flip-flop 410 resets, sending a logic zero on the Q line and thereby de-activating coils K1 and K2 and opening relays 24, 26. Thus, the main inverter 20 is disconnected from the load 30. At the same time, MOSFET 224 is turned on causing a CLAMP signal to be transmitted on line 230 to the logic device 640. The CLAMP signal assures that the main inverter is not inadvertently connected to the load 30. That is, the CLAMP signal pulls the threshold input THRES of device 640 to ground, thereby preventing a false reset pulse from propagating through the circuitry. A subsequent HELP signal activation operates to clear the CLAMP signal.

In one embodiment of the invention, logic device 640 may advantageously be a conventional programmable tone generator circuit such as model number LM 7555. Resistor 638 and capacitor 670 operate in combination to provide about a three second time delay, also serving to prevent false reset pulses. The time delay may be selected as appropriate to prevent rapid on and off switching (sometimes called "ratcheting") of the main inverter 20 caused by transient conditions.

The invention has been described herein in considerable detail in order to comply with the Patent Statutes and to provide those skilled in the art with the information needed to apply the novel principles and to construct and use such specialized components as are required. However, it is to be understood that the invention can be carried out by specifically different equipment and devices, and that various modifications, both as to the equipment details and operating procedures, can be accomplished without departing from the scope of the invention itself.

What is claimed is:

1. A power supply apparatus for supplying an alternating current comprising:
   (a) a first means for supplying an alternating current to a load having a first power output;
   (b) a second means for supplying an alternating current to the lead having a second power output;
   (c) a switching means for connecting the first power output and the second power output to a third power output; and
   (d) a load monitoring means for monitoring the third power output, wherein the load monitoring means has an input coupled to the third power output, and wherein the load monitoring means includes a monitor output, wherein the switching means also has an input connected to the monitor output and switches the first power supply on when the monitor output exceeds a threshold and shuts off the first power supply when the monitor output drops below the threshold.

2. The power supply apparatus of claim 1 wherein the first power supply provides more power than the second power supply.

3. The power supply apparatus of claim 1 wherein the first power supply and the second power supply further comprise inverters.

4. The power supply apparatus of claim 1 further comprising a delay means for providing a predetermined time delay to the switching means wherein the switching means waits until the predetermined time delay has expired before switching.

5. A co-inverter apparatus for supplying alternating current to a load comprising:
  a. first means for inverting direct current to alternating current, the first inverting means including an output;
  b. second means for inverting direct current to alternating current wherein the second inverting means has a current level output and wherein the second inverting means has an output connected across the load;
  c. switching means coupled at an input to the output of the first inverting means and coupled at an output to the load for engaging and disengaging the first inverting means from the load, the switching means including a control input;
  d. a means for controlling the switching means wherein the controlling means is connected to the switching means control input, wherein the controlling means includes a first comparator input and a second comparator input, the first comparator input being connected to a first predetermined threshold signal, and wherein the controlling means further includes a third comparator input and a fourth comparator input wherein the third comparator input is connected to a second predetermined threshold signal; and
  e. sensing means coupled at a first input to the current level output of the second inverting means for sensing a load increase from the second inverting means, the sensing means having a load increase signal which is connected to the second comparator input of the controlling means, wherein:
    (1) the controlling means compares the load increase signal to the first predetermined threshold signal; and
    (2) if the load increase signal exceeds the first predetermined threshold signal the controlling means supplies a set signal to the switching means control input and the switching means engages the first inverting means to the load in response to the set signal; and
    (3) if the load signal is less than the second predetermined threshold signal the controlling means supplies a reset signal to the switching means control input and the switching means disengages the first inverting means from the load in response to the reset signal.

6. The apparatus of claim 5 further comprising a means for adjusting the first predetermined threshold signal connected to an output carrying the first predetermined threshold signal.

7. The apparatus of claim 6 wherein the switching means further comprises first and second thyristers operating in parallel with first and second relay contacts respectively so as to immediately connect the first inverting means to the load through the first and second thyristers upon receiving the set signal while later shorting out the first and second thyristers through the first and second relay contacts respectively.

8. The apparatus of claim 5 wherein the first inverting means and second inverting means are operated synchronously using shared drive signals.

9. The apparatus of claim 6 wherein the first inverting means and second inverting means are operated synchronously using shared drive signals.

10. The apparatus of claim 7 wherein the first and second inverters are operated synchronously using shared drive signals.

11. The apparatus of claim 5 further comprising a means for adjusting the first predetermined threshold signal and the second predetermined threshold signal, the means for adjusting being coupled to the first comparator input and the second comparator input.

12. The apparatus of claim 11 wherein the first and second predetermined threshold signals are adjustable in a range proportional to loads of 17 to 75 watts.

13. A co-inverter apparatus for supplying alternating current to a load comprising:
  a. first means for inverting direct current to alternating current, the first inverting means including an output;
  b. second means for inverting direct current to alternating current wherein the second inverting means has a current level output, wherein the second inverting means has an output connected across the load, and wherein the first inverting means and the second inverting means are operated synchronously using shared drive signals;
  c. switching means, coupled at an input to the output of the first inverting means and coupled at an output to the load, for engaging and disengaging the first inverting means from the load, the switching means including a control input;
  d. a means for adjusting a first predetermined threshold signal and a second predetermined threshold signal;
  e. a means for controlling the switching means wherein the controlling means is connected to the switching means control input, wherein the controlling means includes first and second comparator inputs, the first comparator input being connected to the first predetermined threshold signal, and wherein the controlling means further includes third and fourth comparator inputs wherein the third comparator input is connected to the second predetermined threshold signal; and
  f. sensing means, coupled at a first input to the current level output of the second inverting means, for sensing a load increase from the second inverting means, the sensing means having a load increase signal which is connected to the second comparator input of the controlling means wherein:
    (1) the controlling means compares the load increase signal to the finest predetermined threshold signal; and
    (2) if the load increase signal exceeds the first predetermined threshold signal, the controlling means supplies a set signal to the switching means control input and the switching means engages the first inverting means to the load in response to the set signal; and
    (3) if the load signal is less than the second predetermined threshold signal, the controlling means supplies a reset signal to the switching means control input, and the switching means disengages the first inverting means from the load in response to the reset signal.

14. The apparatus of claim 13 wherein the switching means further comprises first and second thyristers operating in parallel with first and second relay contacts so as to immediately connect the first inverting means to the load through the first and second thyristers upon receiving the set signal while later shorting out the first and second thyristers through the first and second relay contacts.

15. The apparatus of claim 14 wherein the first and second predetermined threshold signals are adjustable in a range proportional to loads of 17 to 75 watts.

* * * * *